US012572305B2

(12) United States Patent
Shen et al.

(10) Patent No.: US 12,572,305 B2
(45) Date of Patent: Mar. 10, 2026

(54) DATA PROCESSING METHOD AND APPARATUS

(71) Applicant: HUAWEI TECHNOLOGIES CO., LTD., Guangdong (CN)

(72) Inventors: Shaofeng Shen, Hangzhou (CN); Jiaqiang Xia, Hangzhou (CN); Gangpin Mao, Hangzhou (CN); Xiang Xiao, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 27 days.

(21) Appl. No.: 18/512,033

(22) Filed: Nov. 17, 2023

(65) Prior Publication Data

US 2024/0086114 A1 Mar. 14, 2024

Related U.S. Application Data

(63) Continuation of application No. PCT/CN2021/097050, filed on May 29, 2021.

(51) Int. Cl.
G06F 3/06 (2006.01)

(52) U.S. Cl.
CPC ............ G06F 3/0659 (2013.01); G06F 3/061 (2013.01); G06F 3/0673 (2013.01)

(58) Field of Classification Search
None
See application file for complete search history.

(56) References Cited

U.S. PATENT DOCUMENTS

| | | | | |
|---|---|---|---|---|
| 7,072,342 B1 * | 7/2006 | Elnathan | ............. | H04L 49/9094 370/412 |
| 7,949,856 B2 * | 5/2011 | Knowles | ............... | G06F 9/3885 712/215 |
| 11,327,895 B1 * | 5/2022 | Vankamamidi | ......... | G06F 3/061 |
| 2015/0095563 A1 * | 4/2015 | Royer, Jr. | ............. | G06F 3/0659 711/105 |
| 2019/0250855 A1 | 8/2019 | Kachare et al. | | |
| 2023/0068463 A1 * | 3/2023 | Fei | ......................... | G06F 9/3838 |

FOREIGN PATENT DOCUMENTS

| | | |
|---|---|---|
| CN | 106055504 A | 10/2016 |
| CN | 112767978 A | 5/2021 |
| CN | 111542803 B | 10/2021 |

OTHER PUBLICATIONS

Jedec Standard, Universal Flash Storage (UFS) Version 3.1, JESD220E, Jan. 2020, total 421 pages.

* cited by examiner

*Primary Examiner* — Stephanie Wu

(57) ABSTRACT

In a data processing method, a first device obtains a plurality of first commands. To ensure an execution sequence of the plurality of first commands, the first device performs encapsulation on each first command to obtain a second command. The encapsulation includes adding a sequence identifier for each of target commands in the plurality of first commands that have an order-preserving requirement. The first device sends the plurality of second commands in parallel. The second device receives the plurality of second commands in parallel and performs decapsulation on the second commands to retrieve the first commands with their sequence identifiers. The second device then schedules the plurality of first commands for execution based on their sequence identifiers.

9 Claims, 4 Drawing Sheets

Data processing apparatus 400

Data processing apparatus 500

DATA PROCESSING METHOD AND APPARATUS

CROSS-REFERENCE TO RELATED APPLICATIONS

This application is a continuation of International Application PCT/CN2021/097050, filed on May 29, 2021, the disclosure of which is hereby incorporated by reference in its entirety.

TECHNICAL FIELD

Embodiments of this application relate to the field of data storage technologies, and in particular, to a data processing method and apparatus.

BACKGROUND

User operation behavior (for example, application operation, picture downloading, and online chatting) may be understood as performing an operation on a file system, for example, reading and saving a file (i.e., data). The file system converts the user operation behavior into commands such as an IO read command and an IO write command.

In some scenarios, a plurality of commands have an order-preserving requirement. How to ensure an execution sequence between the plurality of commands is a technical problem that needs to be resolved.

SUMMARY

Embodiments of this application provide a data processing method and apparatus, to ensure an execution sequence of a plurality of commands.

According to a first aspect, a data processing method is provided. First, a first device obtains a plurality of first commands. Then, the first device performs encapsulation on the first command to obtain a second command, where when the plurality of first commands include at least two target commands having an order-preserving requirement, the encapsulation includes adding a sequence identifier for the target command, and the sequence identifier indicates an execution sequence of the target command. Next, the first device sends a plurality of second commands in parallel.

Optionally, the encapsulation further includes format conversion, and a converted format meets a protocol between the first device and a second device.

In the first aspect, the first device sends the plurality of second commands (including the first command and the sequence identifier corresponding to the first command) to the second device in parallel, and the second device may schedule the plurality of first commands in sequence based on the sequence identifier, and execute the plurality of first commands in sequence. An execution sequence of the plurality of first commands can be ensured, and the second device can properly use idle time to process the plurality of first commands in time, to reduce waiting time for executing the plurality of first commands, and improve storage system performance and user experience.

In a possible implementation, the first command is an IO command.

In a possible implementation, any one of the first commands is a write command for user data or a write command for node data, where the node data indicates a location at which the user data is stored.

In a possible implementation, an execution sequence of the write command for the node data is earlier than an execution sequence of the write command for the user data. It may be understood that the data processing method is applied to a flash memory friendly file system (F2FS).

In a possible implementation, the first command is used to write data from a memory (on a first device side) to a flash memory array (on a second device side).

In a possible implementation, the sequence identifier is a serial number, and an execution sequence of a command is indicated by using a numerical value of the serial number.

For example, an execution sequence of a command with a smaller serial number is earlier than an execution sequence of a command with a larger serial number, or the execution sequence of the command with the larger serial number is earlier than the execution sequence of the command with the smaller serial number.

In a possible implementation, the first device may further obtain an order-preserving identifier command, where the order-preserving identifier command indicates that an execution sequence of a command before the order-preserving identifier command is earlier than an execution sequence of a next command (a $1^{st}$ command after the order-preserving identifier command) of the order-preserving identifier command. Further, a first command obtained before the order-preserving identifier command and the $1^{st}$ command obtained after the order-preserving identifier command may be determined as the target command.

In a possible implementation, a serial number added by the first device for the first command obtained before the order-preserving identifier command is different from a serial number added for the $1^{st}$ first command obtained after the order-preserving identifier command.

For example, the serial number added by the first device for the first command obtained before the order-preserving identifier command is less than the serial number added for the $1^{st}$ first command obtained after the order-preserving identifier command. Alternatively, the serial number added by the first device for the first command obtained before the order-preserving identifier command is greater than the serial number added for the $1^{st}$ first command obtained after the order-preserving identifier command.

In a possible implementation, the first device sends the plurality of second commands in parallel and out of order.

In a possible implementation, the encapsulation further includes adding a sequence identifier for a first command other than the target command in the plurality of first commands.

According to a second aspect, a data processing method is provided. A second device receives a plurality of second commands in parallel; and then, performs decapsulation on the second command, where the decapsulation includes parsing a first command and a sequence identifier that are included in the second command, and the sequence identifier indicates an execution sequence of a command having an order-preserving requirement. Next, the second device schedules a plurality of first commands based on the sequence identifier.

In the second aspect, the second device receives the plurality of second commands in parallel, and after obtaining the sequence identifier through parsing, the second device may schedule the plurality of first commands in sequence based on the sequence identifier, and execute the plurality of first commands in sequence. An execution sequence of the plurality of first commands can be ensured, and the second device can properly use idle time to process the plurality of first commands in time, to reduce waiting time for executing the plurality of first commands, and improve storage system performance and user experience.

In a possible implementation, the sequence identifier is a serial number. The second device may schedule the plurality of first commands based on a numerical value of the serial number.

In a possible implementation, the second device receives the plurality of second commands in parallel and out of order.

According to a third aspect, a data processing apparatus is provided. The apparatus has functions of implementing any one of the first aspect and the possible implementations of the first aspect. The functions may be implemented by using hardware, or may be implemented by hardware executing corresponding software. The hardware or software includes one or more functional modules corresponding to the foregoing functions.

In a possible implementation, the data processing apparatus includes a file system layer, a driver layer, and a first interface layer.

The file system layer is configured to obtain a plurality of first commands. Alternatively, the driver layer is configured to obtain the plurality of first commands. It may be understood that after obtaining the plurality of first commands, the file system layer sends the plurality of first commands to the driver layer.

The driver layer is configured to perform encapsulation on the first command to obtain a second command, where when the plurality of first commands include at least two target commands having an order-preserving requirement, the encapsulation includes adding a sequence identifier for the target command, and the sequence identifier indicates an execution sequence of the target command.

The first interface layer is configured to send a plurality of second commands in parallel.

In a possible implementation, the file system layer may further send an order-preserving identifier command (flag) to the driver layer. Correspondingly, the driver layer is further configured to obtain the order-preserving identifier command from the file system layer. The order-preserving identifier command (flag) indicates that an execution sequence of a first command before the order-preserving identifier command (flag) is earlier than an execution sequence of a next first command (a $1^{st}$ command after the order-preserving identifier command) of the order-preserving identifier command (flag). Optionally, the order-preserving identifier command (flag) is sent between any two target commands, and there is no other command between the order-preserving identifier command (flag) and the target command whose sending time is later in the two target commands.

The driver layer is further configured to determine, as the target command, the first command obtained before the order-preserving identifier command and the $1^{st}$ command obtained after the order-preserving identifier command.

In a possible implementation, a serial number added by the driver layer for the first command obtained before the order-preserving identifier command is different from a serial number added for the $1^{st}$ first command obtained after the order-preserving identifier command.

In a possible implementation, the first interface layer sends the plurality of second commands in parallel and out of order.

In a possible implementation, the encapsulation further includes adding a sequence identifier for a first command other than the target command in the plurality of first commands.

According to a fourth aspect, a data processing apparatus is provided. The apparatus has functions of implementing any one of the second aspect and the possible implementations of the second aspect. The functions may be implemented by using hardware, or may be implemented by hardware executing corresponding software. The hardware or software includes one or more functional modules corresponding to the foregoing functions.

In a possible implementation, the data processing apparatus includes a second interface layer and a command scheduling layer.

The second interface layer is configured to receive a plurality of second commands in parallel.

The command scheduling layer is configured to: perform decapsulation on the second command, where the decapsulation includes parsing a first command and a sequence identifier that are included in the second command, and the sequence identifier indicates an execution sequence of a command having an order-preserving requirement; and schedule a plurality of first commands based on the sequence identifier.

According to a fifth aspect, a data processing apparatus is provided, including a processor, and optionally, further including a memory. The processor is coupled to the memory. The memory is configured to store computer programs or instructions. The processor is configured to execute some or all of the computer programs or instructions in the memory. When the some or all of the computer programs or instructions are executed, the processor is configured to implement a function of the first device in the method according to any one of the first aspect or the possible implementations of the first aspect or implement a function of the second device in any one of the second aspect or the possible implementations of the second aspect.

In a possible implementation, the apparatus may further include a communication interface, where the communication interface is coupled to the processor, and the communication interface is configured to: send a signal processed by the processor, or receive a signal input to the processor. The interface may perform a sending action or a receiving action performed by the first device in any one of the first aspect or the possible implementations of the first aspect, or perform a sending action or a receiving action performed by the second device in any one of the second aspect or the possible implementations of the second aspect.

For example, when being configured to implement a function of the first device in the method in any one of the first aspect or the possible implementations of the first aspect:

the processor is configured to: obtain a plurality of first commands, and perform encapsulation on the first command to obtain a second command, where when the plurality of first commands include at least two target commands having an order-preserving requirement, the encapsulation includes adding a sequence identifier for the target command, and the sequence identifier indicates an execution sequence of the target command; and the communication interface is configured to send a plurality of second commands in parallel.

For example, the first command is an IO command.

For example, the first command is a write command for user data or a write command for node data, where the node data indicates a location at which the user data is stored.

For example, the sequence identifier is a serial number, and an execution sequence is indicated by using a numerical value of the serial number.

For example, the processor is further configured to: obtain an order-preserving identifier command, where the order-preserving identifier command indicates that an execution sequence of a command before the order-preserving identifier command is earlier than an execution sequence of a next command of the order-preserving identifier command; and determine, as the target command, a first command obtained before the order-preserving identifier command and a $1^{st}$ command obtained after the order-preserving identifier command.

For example, a serial number added for the first command obtained before the order-preserving identifier command is different from a serial number added for the $1^{st}$ first command obtained after the order-preserving identifier command.

For example, when the communication interface is configured to send the plurality of second commands in parallel, the communication interface is specifically configured to send the plurality of second commands in parallel and out of order.

For example, the encapsulation further includes adding a sequence identifier for a first command other than the target command in the plurality of first commands.

According to a sixth aspect, a storage controller is provided, including a processor and a communication interface coupled to the processor.

The communication interface is configured to receive a plurality of second commands in parallel.

The processor is configured to: perform decapsulation on the second command, where the decapsulation includes parsing a first command and a sequence identifier that are included in the second command, and the sequence identifier indicates an execution sequence of a command having an order-preserving requirement; and schedule a plurality of first commands based on the sequence identifier.

In a possible implementation, the sequence identifier is a serial number. When the processor is configured to schedule the plurality of first commands based on the sequence identifier, the processor is specifically configured to schedule the plurality of first commands based on a numerical value of the serial number.

According to a seventh aspect, a flash memory is provided. The flash memory includes the storage controller described in the sixth aspect and a flash memory array. The storage controller is configured to schedule a first command to access the flash memory array.

According to an eighth aspect, a computer-readable storage medium is provided. The computer-readable storage medium is configured to store a computer program. The computer program includes instructions used to implement a function in any one of the first aspect and the possible implementations of the first aspect, or instructions used to implement a function in any one of the second aspect and the possible implementations of the second aspect.

Alternatively, a computer-readable storage medium is provided. The computer-readable storage medium is configured to store a computer program. When the computer program is executed by a computer, the computer may be enabled to perform the method performed by the first device in any one of the first aspect or the possible implementations of the first aspect, or perform the method performed by the second device in any one of the second aspect or the possible implementations of the second aspect.

According to a ninth aspect, a computer program product is provided. The computer program product includes computer program code. When the computer program code is run on a computer, the computer is enabled to perform the method performed by the first device in any one of the first aspect or the possible implementations of the first aspect, or perform the method performed by the second device in any one of the second aspect or the possible implementations of the second aspect.

For technical effects of the third aspect to the ninth aspect, refer to descriptions of the first aspect to the second aspect. Details are not repeated herein.

DESCRIPTION OF EMBODIMENTS

Figure 1:
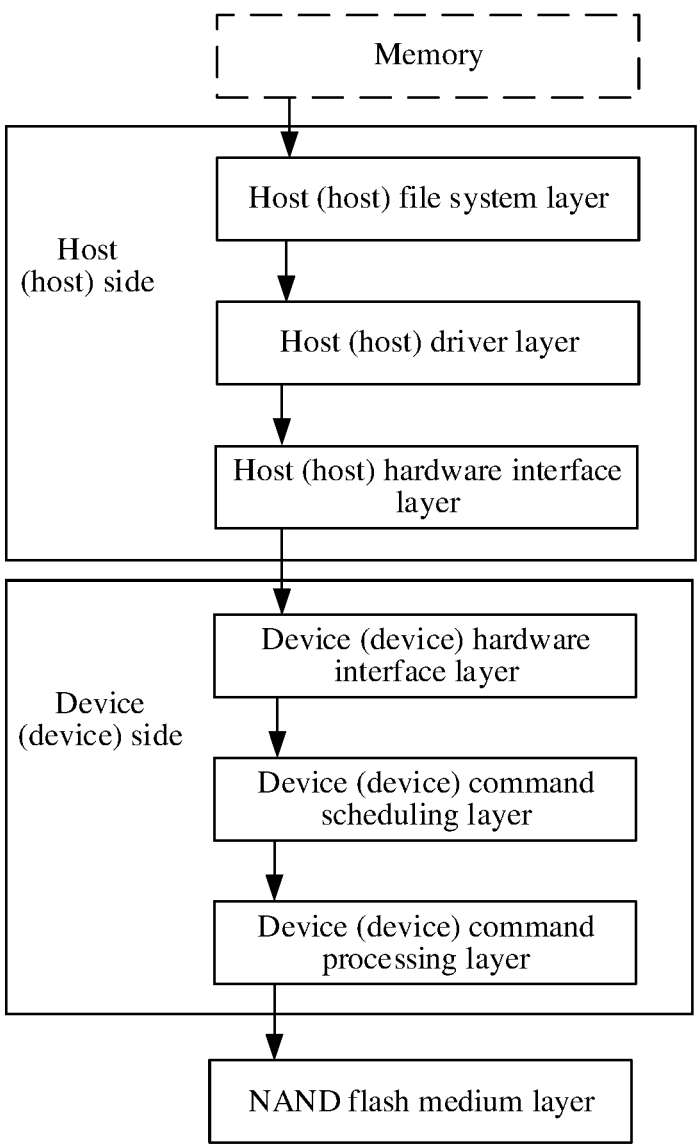
FIG. 1 is a diagram of a structure of a NAND flash memory system applicable to an embodiment of this application.

The following describes some terms in embodiments of this application, to facilitate understanding by persons skilled in the art.

(1) A file system in this application may be understood as a system configured to manage a file. Data of the file system includes node data and user data. The user data is the file, such as a picture, a video, and a chat record. The node data is used for the file system to index a logical location of the file in a storage device.

User operation behavior (for example, application operation, picture downloading, and online chatting) may be understood as performing an operation on the file system, mainly including reading and saving the file. The file system converts the user operation behavior into commands such as an IO read command, an IO write command, and a FLUSH command (where the command may alternatively be referred to as a request).

Data corresponding to the IO read command and the IO write command includes the user data of the file (for example, a picture), and may further include the node data generated by the file system and used to record a specific location of the user data in the file system. The node data is similar to a multi-level index table. In most cases, the node data can be saved to the storage device only after the user data of the file is written to the storage device, so that the file system searches for the user data of the file based on the node data. If the node data is first stored to the storage device, but the user data of the file is not stored in a logical location corresponding to the node data, when the file system searches for the user data of the file based on the node data, an exception occurs because the user data cannot be found.

Currently, the file system performs order preserving between the user data of the file and related node data in a serial manner or by interspersing the FLUSH command.

(2) Difference Between a Flash Memory and a Memory

The memory may be, for example, a random access memory (RAM), and data is not retained when the power is off. Content of a storage unit may be read or written at will as needed, and speeds of writing and reading are independent of a location of the storage unit. Stored content is lost when the power is off, and the memory is mainly used to store a program used for a short time.

The flash memory: Data is retained when the power is off. The flash memory has performance of an electronically erasable programmable read-only memory (EEPROM), can retain data for a long time without power, has a storage feature that is equivalent to that of a hard disk, and can read data quickly. Currently, the flash memory mainly includes a NOR flash memory and an NAND flash memory.

For ease of understanding embodiments of this application, the following describes an application scenario of this application. A network architecture and a service scenario described in embodiments of this application are intended to describe the technical solutions in embodiments of this application more clearly, and do not constitute any limitation on the technical solutions provided in embodiments of this application. Persons of ordinary skill in the art may know that, as a new service scenario emerges, the technical solutions provided in embodiments of this application are also applicable to a similar technical problem.

When a user uses an electronic device, information such as a picture, a chat record, and a video is first stored in a memory of the electronic device. The memory may be a cache for data exchange, and the cache may be considered as a part of a central processing unit (CPU). For information that does not expect to be lost, the CPU may extract the information from the memory and store the information in a flash memory array of a storage device (for example, a memory card). Certainly, for information that needs to be viewed in time, the CPU may also extract the information from the flash memory array and store the information in the memory. Alternatively, when a system is powered on, the CPU copies to-be-run data in the flash memory array to the memory (for example, a RAM) for storage. When the system starts to be power off, the CPU copies the data run in the memory (such as the RAM) to the flash memory array for storage.

The following describes a schematic diagram of a storage system based on an NAND flash memory with reference to FIG. 1, and describes a process in which information is stored from a memory to a flash memory array (e.g., an NAND flash medium layer) and stored from the flash memory array to the memory.

As shown in FIG. 1, the storage system includes a memory, a host file system layer, a host driver layer, a host device hardware interface layer, a device hardware interface layer, a device command scheduling layer, a device command processing layer, and an NAND flash medium layer. For example, the memory may be considered as a cache in a CPU in an electronic device. A host side may be considered as the CPU in the electronic device. A device side may be considered as a controller (a processor) in a storage device (for example, a memory card) of the electronic device. The NAND flash medium layer may be considered as a flash memory array in the memory card.

The host file system layer is mainly responsible for scheduling and processing a user operation request, converting the user operation request into a block device request, and delivering the block device request to the host driver layer, and may further process an execution result that is of the block device request and that is returned by the host driver layer. The host driver layer is mainly responsible for receiving the block device request delivered by the host file system layer and converting the block device request into a command in a format required by host and device interface protocols. The command is sent to the device through the host device hardware interface layer, and an execution result that is of the command and that is returned by the device is processed. The host device hardware interface layer and the device hardware interface layer are mainly responsible for providing a channel for high-speed command interaction between the host and the device. The device command scheduling layer is mainly responsible for scheduling the command delivered by the host driver layer and sending the command to the device command processing layer. The device command processing layer is mainly responsible for processing the command delivered by the host and returning the execution result of the command to the host. The NAND flash medium layer stores data carried in the command.

For the storage system based on the NAND flash memory, there is a typical request (where the request may also be referred to as a command), for example, an IO write request and an IO read request. The host file system layer writes specific data in the memory to an NAND flash medium by using the IO write request. The host file system layer reads the specific data from the NAND flash medium to the memory by using the IO read request.

In some scenarios, a plurality of concurrent IO write commands have an order-preserving requirement. For example, in a flash memory friendly file system (F2FS), the IO write command includes an IO write command for user data of a file, and may further include an IO write command for node data. The node data can be saved to a flash memory array (for example, the NAND flash medium) of the storage device only after the user data is written to a flash memory array of the storage device. To be specific, the IO write command for the user data is executed first, and then the IO write command for the node data is executed. For another example, any four IO write commands are IO_W0, IO_W1, IO_W2, and IO_W3 in sequence, and IO_W1 and IO_W2 have the order-preserving requirement. For example, the write command IO_W2 can be executed only after the write command IO_W1 is executed. A sequence of other commands is not limited.

The host file system layer may wait, between a plurality of IO write commands having the order-preserving requirement, for delivery executing. To be specific, after one IO write command is executed and an execution result of the command is returned to the host file system layer, the host file system layer delivers a next IO write command. The host file system layer ensures, in a serial execution manner, an execution sequence of the plurality IO write commands having the order-preserving requirement.

However, latency is long when the commands are executed in serial. This affects performance of the storage system. Especially, serial waiting of a command for a high-priority service in the storage system results in greatly deteriorated performance of the entire storage system and poor user experience in a scenario in which there is the order-preserving requirement of the command.

In view of this, this application proposes a technical solution of sending a plurality of commands in parallel. A sequence identifier is separately allocated to the plurality of commands, and a sequence of executing the commands is indicated by using the sequence identifier, to reduce waiting time for executing the plurality of commands, and improve performance of a storage system and user experience.

The following describes the solution in detail with reference to the accompanying drawings. Features or content denoted by dashed lines in the accompanying drawings may be understood as optional operations or optional structures in embodiments of this application.

Figure 2:
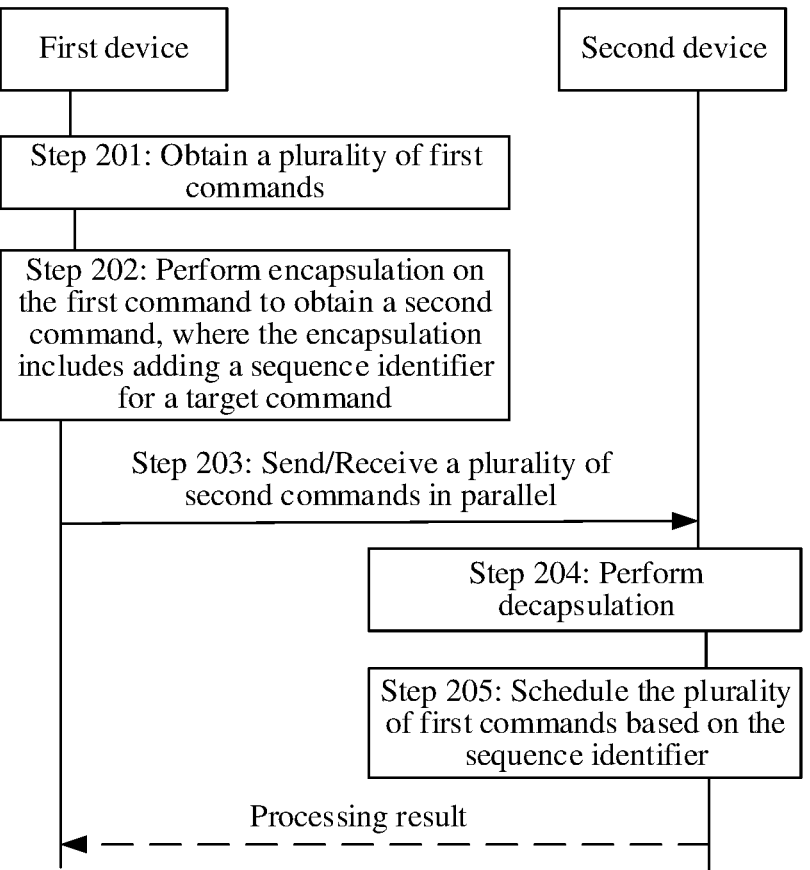
FIG. 2 is a schematic diagram of a data processing process applicable to an embodiment of this application.

As shown in FIG. 2, a data processing method is provided, including the following steps.

Step 201: A first device obtains a plurality of first commands.

Herein, the first command is a command, and "first" is for ease of distinguishing from a subsequent second command. The second command is an encapsulated command. For example, format conversion is performed on the first command. For another example, the second command includes the first command and a sequence identifier allocated (where allocating and adding are interchangeable) to the first command.

The first command may be an IO command, or may be an RPMB command. The first command includes a write command and/or a read command, such as an IO write command and/or an IO read command. For example, the write command (the first command) is used to write data in a memory (a memory on a first device side) into a flash memory array (a flash memory array on a second device side), and the read command is used to read data in the flash memory array into the memory.

All of the plurality of obtained first commands may have no protection requirement, or all the first commands have an order-preserving requirement, or some (at least two) of the first commands have the order-preserving requirement and some of the first commands have no order-preserving requirement. For example, four obtained first commands are IO_W0, IO_W1, IO_W2, and IO_W3 respectively, and IO_W1 and IO_W2 have the order-preserving requirement. For example, the command IO_W2 can be executed only after the command IO_W1 is executed. A sequence of other commands is not limited.

For example, a type of the command may be a write command for user data, or may be a write command for node data. For example, the plurality of first commands include the write command for the user data and the write command for the node data, where the node data indicates a location at which the user data is stored. For example, an execution sequence of the write command for the node data needs to be after an execution sequence of the write command for the user data. To be specific, the command for the user data is executed first, and then the command for the node data is executed.

With reference to FIG. 1, the process in step 201 may be performed by the host file system layer, or may be performed by the host driver layer.

Step 202: The first device performs encapsulation on the first command to obtain the second command.

In this application, a command that has not been encapsulated is referred to as the first command, and an encapsulated command is referred to as the second command.

In an example, the encapsulation may also be referred to as an encapsulation command format. The encapsulation includes format conversion, and a converted format (to be specific, a format of the second command) meets a communication protocol between the first device and the second device.

In an example, when the plurality of first commands include at least two target commands having an order-preserving requirement, the encapsulation further includes adding a sequence identifier for the target command, and the sequence identifier indicates an execution sequence of the target command.

For example, a sequence identifier is added to a command field.

Optionally, the encapsulation further includes: adding a sequence identifier for a first command other than the target command in the plurality of first commands. To be specific, the first device may add the sequence identifier for only the target command having the order-preserving requirement. Optionally, the first device may alternatively add the sequence identifier for the first command having no order-preserving requirement. Sequence identifiers of first commands (having no order-preserving requirement) other than the target command are not limited, and may be the same or different.

The first device may identify, from the plurality of first commands, which commands are the first commands having the order-preserving requirement (for ease of differentiation, the first command having the order-preserving requirement is referred to as the target command), and which commands are the first commands having no order-preserving requirement.

For example, the first device may determine, based on a command type, which commands have the order-preserving requirement. For example, the command for the user data and the command for the node data have the order-preserving requirement. For example, the command for the user data is executed first, and then the command for the node data is executed.

For example, the first device may determine, by using a priority of a command, which commands have the order-preserving requirement. For example, the priority of the command may be reflected by using the command type. For example, the command for the user data and the command for the node data have the order-preserving requirement. For another example, the priority of the command may alternatively be reflected by using a priority identifier. For example, a command having the priority identifier has the order-preserving requirement. For another example, the priority of the command may alternatively be reflected by using a service. For example, a command for a service and a command for another service have the order-preserving requirement. The first device may further determine an execution sequence requirement of the target command in the first command based on the priority. For example, an execution sequence of a target command with a higher priority is earlier, and an execution sequence of a target command with a lower priority is later.

For another example, when obtaining the plurality of first commands, the first device may further obtain the order-preserving identifier command (flag). The order-preserving identifier command indicates that an execution sequence of a first command before the order-preserving identifier command is earlier than an execution sequence of a next first command (a $1^{st}$ first command after the order-preserving identifier command) of the order-preserving identifier command.

The first device may identify, by using the order-preserving identifier command, which commands have the order-preserving requirement. For example, the first command obtained before the order-preserving identifier command, and the $1^{st}$ first command obtained after the order-preserving identifier command are determined as the target command having the order-preserving requirement.

For example, when a sequence of commands obtained by the first device is: IO_W0, IO_W1, the flag, IO_W2, and IO_W3, IO_W0, IO_W1, and IO_W2 may be determined as the target command, and an execution sequence of IO_W0 and an execution sequence of IO_W1 are earlier than an execution sequence of IO_W2. There is no limitation on an execution sequence between IO_W3 and the other several commands.

For example, when a sequence of commands obtained by the first device is: IO_W1, the flag, IO_W2, IO_W0, and IO_W3, IO_W1 and IO_W2 may be determined as the target command, and an execution sequence of IO_W1 is earlier than an execution sequence of IO_W2. There is no limitation on an execution sequence between IO_W0 and IO_W3, and there is no limitation on an execution sequence between IO_W0, IO_W3, and the other several commands.

For example, when a sequence of commands obtained by the first device is: IO_W0, the flag, IO_W3, IO_W1, the flag, and IO_W2, IO_W0, IO_W3 IO_W1, and IO_W2 may be determined as the target command. An execution sequence of IO_W0 is earlier than the execution sequence of IO_W3. In addition, an execution sequence of IO_W0, the execution sequence of IO_W3, and an execution sequence of IO_W1 are earlier than an execution sequence of IO_W2.

In an example, the sequence identifier includes a serial number (SN), and a numerical value of the serial number may indicate the execution sequence of the plurality of first commands. For example, an execution sequence of a command with a smaller serial number is earlier than an execution sequence of a command with a larger serial number. For another example, the execution sequence of the command with the smaller serial number is later than the execution sequence of the command with the larger serial number. In other words, the execution sequence of the command with the larger serial number is less than the execution sequence of the command with the smaller serial number. Alternatively, the sequence identifier may be a, b, c, A, B, C, and the like.

When the first device allocates the serial number SN to the plurality of first commands, cases may be as follows.

In an example, a serial number allocated to the target command (the first command) whose execution sequence needs to be earlier is greater than a serial number allocated to the target command (the first command) whose execution sequence needs to be later (that is, a command with a larger serial number is executed first, and a command with a smaller serial number is executed later). A value of the serial number allocated to the first command having no order-preserving requirement is not limited.

For example, if an execution sequence of a first command with a higher priority is earlier, and an execution sequence of a first command with a lower priority is later, the serial number may be allocated to the plurality of first commands in descending order of the priorities and the serial numbers. In other words, a serial number allocated to a first command with a higher priority is larger, and a serial number allocated to a first command with a lower priority is smaller. For example, when the command for the user data is executed first, and then the command for the node data is executed, a serial number allocated to the write command for the node data is greater than a serial number allocated to the write command for the user data.

For example, a serial number added for the first command obtained before the order-preserving identifier command is different from a serial number added for the 1$^{st}$ first command obtained after the order-preserving identifier command.

For example, a serial number added for the command obtained before the order-preserving identifier command (flag) is greater than a serial number added for the 1$^{st}$ command obtained after the order-preserving identifier command. For a 2$^{nd}$ command, a 3$^{rd}$ command, . . . , and the like that are obtained after the order-preserving identifier command, a numerical value of an added serial number is not limited.

In another example, the case may be certainly reverse, to be specific, the serial number allocated to the first command whose execution sequence needs to be earlier is less than the serial number allocated to the first command whose execution sequence needs to be later (in other words, a command with a smaller serial number is executed first, and a command with a larger serial number is executed later). A value of the serial number allocated to the first command having no order-preserving requirement is not limited.

For example, the serial number are allocated to the plurality of first commands in descending order of priorities and in ascending order of serial numbers. In other words, the serial number allocated to the first command with the higher priority is smaller, and the serial number allocated to the first command with the lower priority is larger.

For example, a serial number allocated to the write command for the node data is less than a serial number allocated to the write command for the user data.

For example, a serial number added for the command obtained before the order-preserving identifier command (flag) is less than a serial number added for the 1$^{st}$ command obtained after the order-preserving identifier command. For a 2$^{nd}$ command, a 3$^{rd}$ command, . . . , and the like that are obtained after the order-preserving identifier command, a numerical value of an added serial number is not limited.

The target command is the command having the order-preserving requirement in the plurality of first commands, and for another first command having no order-preserving requirement, a value of an added serial number is not limited. For example, four first commands are IO_W0, IO_W1, IO_W2, and IO_W3 respectively. IO_W1 and IO_W2 have the order-preserving requirement. For example, the command IO_W2 can be executed only after the command IO_W1 is executed. A sequence of the other commands is not limited.

If it is specified that a command with a smaller serial number is executed first, and a command with a larger serial number is executed later, serial numbers SNs are allocated to the four first commands, for example, IO_W0_SNx, IO_W1_SNx, IO_W2_SNx+1, and IO_W3_SNx, for another example, IO_W0_SNx, IO_W1_SNx, IO_W2_SNx+1, and IO_W3_SNx+1, for another example, IO_W0_SNx, IO_W1_SNx, IO_W2_SNx+2, and IO_W3_SNx+1, and the like. It only needs to ensure that the serial number of IO_W1 is smaller than the serial number of IO_W2.

If it is specified that a command with a larger serial number is executed first, and a command with a smaller serial number is executed later, when serial numbers SNs are allocated to the four first commands, it only needs to ensure that the serial number of IO_W1 is greater than a serial number of IO_W2.

It may be understood that the serial number SN may not be allocated to IO_W0 and IO_W3.

With reference to FIG. 1, the process in step 202 may be performed by the host driver layer.

Step 203: The first device sends a plurality of second commands in parallel. Correspondingly, the second device receives the plurality of second commands in parallel.

Time required for sending the plurality of commands in parallel is less than a preset threshold, and the preset threshold is far less than time required for sending the plurality of commands in serial (where sending in serial needs to wait for a processing result). "Sending the plurality of commands in parallel" may also be understood as sending a next command without waiting for a processing result of a previous command. "Sending in parallel" may also be understood as sending in serial without waiting for the processing result.

For example, sending four commands in serial includes: A command 1 is sent first. After a processing result of the command 1 is received, a command 2 is sent. After a processing result of the command 2 is received, a command 3 is sent. After a processing result of the command 3 is received, a command 4 is sent. If a sending time interval between the command 1 and the command 2, between the command 2 and the command 3, and between the command 3 and the command 4 is 10 s, it takes 30 s to send the four commands in serial.

Sending the four commands in parallel includes: When a command is sent, whether a processing result of a previous command is received does not need to be considered. For example, the command 1 is sent first, and the command 2 is sent regardless of whether the processing result of the command 1 is received. The command 3 is sent regardless of whether the processing result of the command 2 is received. The command 4 is sent regardless of whether the processing result of the command 3 is received. It takes 10 s to send the four commands in parallel. Alternatively, a sequence of the four commands is not limited, and the four commands may be sent in random order (for example, out of order).

For the second device, when receiving the four commands in parallel, the command 1, the command 2, the command 3, and the command 4 may be received in sequence, or the command 1, the command 2, the command 3, and the command 4 may be received out of order. In other words, the first device may send the plurality of second commands out of order, and the second device receives the plurality of second commands out of order. Out of order herein is relative to a sequence of obtaining the plurality of first commands by the first device. When a sending sequence of a second command is inconsistent with an obtaining sequence of a first command corresponding to the second command, it may be understood as that the second command is sent out of order.

For example, an obtaining sequence of obtaining the four first commands by the first device is: the command 1, the command 2, the command 3, and the command 4. A sequence of sending the second command by the first device is: the command 1, the command 3, the command 4, and the command 2. This case may be understood as sending the second command out of order.

In addition, when sending the plurality of second commands in parallel, the first device may send the plurality of second commands in parallel in one thread, or may send the plurality of second commands in parallel in a plurality of threads.

With reference to FIG. 1, the process in step 203 may be performed by the host hardware interface layer and the device hardware interface layer.

Step 204: The second device performs decapsulation on the second command after receiving the plurality of second commands, where the decapsulation includes parsing the first command and the sequence identifier added for the first command that are included in the second command.

The sequence identifier indicates an execution sequence of a command having an order-preserving requirement. It can be learned with reference to the foregoing descriptions that, when the sequence identifier is added, the sequence identifier may be added for all the first commands. In this case, the sequence identifier may be obtained by parsing all the second commands. Alternatively, the sequence identifier may be added for some first commands, and no sequence identifier is added for the other first commands. In this case, the sequence identifier may be obtained by parsing some second commands, and the sequence identifier cannot be obtained by parsing the other second commands.

Further, the sequence identifier indicates the execution sequence of the first command.

For example, the sequence identifier may be parsed in the command field.

With reference to FIG. 1, the process in step 204 may be executed by the device command scheduling layer.

Step 205: The second device schedules the plurality of first commands based on the sequence identifier, and further executes the plurality of first commands in sequence based on a scheduling result.

In an example, the second device schedules the plurality of first commands in serial based on the sequence identifier. For example, the command 1 is scheduled first, but after the processing result of the command 1 is received, the command 2 is scheduled, and after the processing result of the command 2 is received, the command 3 is scheduled.

After receiving the plurality of commands, the second device may first parse whether the command (the command field of the command) includes the sequence identifier. If it is parsed out that the command does not include the sequence identifier (or the sequence identifier cannot be parsed out), the command may be executed based on a receiving sequence. If it is parsed out that the command includes the sequence identifier, the command may be executed based on the sequence identifier.

If the sequence identifier can be obtained by parsing some second commands, and the sequence identifier cannot be obtained by parsing some second commands, for other commands whose sequence identifier is not parsed out, the execution sequence is not limited.

For example, the four first commands are IO_W0, IO_W1, IO_W2, and IO_W3 respectively. IO_W1 and IO_W2 have the order-preserving requirement. For example, the command IO_W2 can be executed only after the command IO_W1 is executed. A sequence of the other commands is not limited. It is specified that a command with a smaller serial number is executed first, and a command with a larger serial number is executed later.

The second device receives the four commands: IO_W0, IO_W1_SNx, IO_W2_SNx+1, and IO_W3 in sequence respectively. A sequence of scheduling IO_W1 and IO_W2 by the second device is: IO_W1 is scheduled first, and then IO_W2 is scheduled. A sequence of scheduling IO_W0 and IO_W3 is not limited.

For example, scheduling is performed in sequence based on the receiving sequence, to be specific, IO_W0, IO_W1, IO_W2, and IO_W3 are scheduled in sequence.

For another example, the command having the sequence identifier is scheduled first, for example, IO_W1, IO_W2, IO_W0, and IO_W3 are scheduled in sequence.

For another example, the command having the sequence identifier is scheduled last, for example, IO_W0, IO_W3, IO_W1, and IO_W2 are scheduled in sequence.

After executing a specific first command, the second device may return a processing result of the first command to the first device. A process of returning the processing result is not limited in this application.

When the first device sends the plurality of first commands in serial (where sending in serial needs to wait for a processing result), for example, the first device sends the command 1 first, and then sends the command 2 after receiving the processing result of the command 1, if in a process in which the second device completes processing the command 1, and feeds back the processing result of the command 1 to the first device, the second device is still capable of continuing to process a command, but the first device has not sent the command 2 to the second device to wait for the processing result of the command 1, idle time of the second device is wasted. In addition, when the first device sends the command 2 to the second device, the second device may not be capable of processing the command 2 in time due to increasingly heavy load or another reason. In this case, the command 2 needs to continuously wait to be processed, and time for processing the plurality of first commands is prolonged.

In this application, the first device sends the plurality of second commands (including the first command and the sequence identifier corresponding to the first command) to the second device in parallel, and the second device may schedule the plurality of first commands in sequence based on the sequence identifier, and execute the plurality of first commands in sequence. An execution sequence of the plurality of first commands can be ensured, and the second device can properly use the idle time to process the plurality of first commands in time, to reduce waiting time for executing the plurality of first commands, and improve storage system performance and user experience.

In an example, the first device includes a driver layer and a first interface layer. Optionally, the first device further includes a file system layer.

When the first device is a host, the file system layer is, for example, the host file system layer in FIG. 1, the driver layer is, for example, the host driver layer in FIG. 1, and the first interface layer is, for example, the host hardware interface layer in FIG. 1.

In step 201, that the first device obtains the plurality of first commands may be: The driver layer obtains the plurality of first commands. For example, an obtaining manner is receiving the plurality of first commands from the file system layer. Alternatively, the file system layer obtains the plurality of first commands.

For specific details of obtaining the first command, refer to the descriptions of step 201. Details are not repeated herein.

In step 202, the first device performs the encapsulation on the first command may be: The driver layer performs the encapsulation on the first command.

For specific details of encapsulating the first command, refer to the descriptions of step 202. Details are not repeated herein.

It may be understood that after obtaining the plurality of first commands, the file system layer sends the plurality of first commands to the driver layer.

In an optional example, the file system layer may further send the plurality of first commands and the order-preserving identifier command (flag) to the driver layer based on the execution sequence of the plurality of first commands. Correspondingly, the driver layer obtains the plurality of first commands and the order-preserving identifier command from the file system layer. The order-preserving identifier command indicates that the execution sequence of the first command before the order-preserving identifier command is earlier than the execution sequence of the next first command of the order-preserving identifier command.

The order-preserving identifier command is sent between any two target commands, and there is no other command between the order-preserving identifier command and the target command whose sending time is later in the two target commands. The target command is the command having the order-preserving requirement in the plurality of first commands.

The four first commands are IO_W0, IO_W1, IO_W2, and IO_W3 respectively: For example, IO_W1 and IO_W2 have the order-preserving requirement (in other words, IO_W1 and IO_W2 are two target commands), and for example, the command IO_W2 can be executed only after the command IO_W1 is executed, and a sequence of the other commands is not limited.

A sequence of sending the four first commands and the order-preserving identifier command by the file system layer to the driver layer includes but is not limited to any one of the following:

IO_W0, IO_W1, the flag, IO_W2, IO_W3; IO_W0, IO_W3, IO_W1, the flag, and IO_W2; IO_W1, the flag, IO_W2, IO_W0, and IO_W3; IO_W1, IO_W0, IO_W3, the flag, IO_W2; or the like. It only needs to ensure that IO_W1 is before IO_W2, and a command following the flag is IO_W2.

For another example, IO_W0, IO_W1, and IO_W2 have the order-preserving requirement (in other words, IO_W0, IO_W1, and IO_W2 are three target commands), and for example, the command IO_W1 needs to be executed first, then the command IO_W1 is executed, then the command IO_W2 is executed, and a sequence of the other commands is not limited.

A sequence of sending the four first commands and the order-preserving identifier command by the file system layer to the driver layer includes but is not limited to any one of the following:

IO_W0, the flag, IO_W1, the flag, IO_W2, IO_W3; IO_W0, IO_W3, the flag, IO_W1, the flag, and IO_W2; IO_W0, the flag, IO_W1, the flag, IO_W3, IO_W2, IO_W0, IO_W3; or the like. It only needs to ensure that IO_W0 is before IO_W1, IO_W1 is before IO_W2, a command following a flag is IO_W1, and a command following another flag is IO_W2.

In step 203, that the first device sends the plurality of second commands in parallel may be: The first interface layer sends the plurality of second commands in parallel. For specific details of sending the plurality of second commands in parallel, refer to the descriptions of step 203. Details are not repeated herein.

In an example, the second device includes a second interface layer and a command scheduling layer, and optionally, further includes a command processing layer.

When the second device is a device, the second interface layer is, for example, the device hardware interface layer in FIG. 1, the command scheduling layer is, for example, the device command scheduling layer in FIG. 1, and the command processing layer is, for example, the device command processing layer in FIG. 1.

In step 203, that the second device receives the plurality of second commands in parallel may be: The second interface layer receives the plurality of second commands in parallel.

It may be understood that the second interface layer sends the plurality of second commands to the command scheduling layer in parallel.

In step 204, after receiving the plurality of second commands, the second device perform the decapsulation on the second commands. The decapsulation may be that the command scheduling layer performs the decapsulation on the second command.

In step 205, that the second device schedules the plurality of first commands based on the sequence identifier may be:

The command scheduling layer schedules the plurality of first commands based on the sequence identifier corresponding to each first command.

Scheduling the plurality of first commands may be understood as sending the plurality of first commands to the command processing layer in serial. Sending the first command to the command processing layer in serial may be understood as sending a next first command to the command processing layer after a processing result of a first command is received.

In step 205, that the second device executes the plurality of first commands in sequence based on the scheduling result may be: The command processing layer receives and executes the first command from the command scheduling layer.

The command sent by the command scheduling layer to the command processing layer does not carry the sequence identifier (for example, the serial number), and a command sent by the command processing layer to the flash medium layer does not carry the sequence identifier (for example, the serial number).

Figure 3:
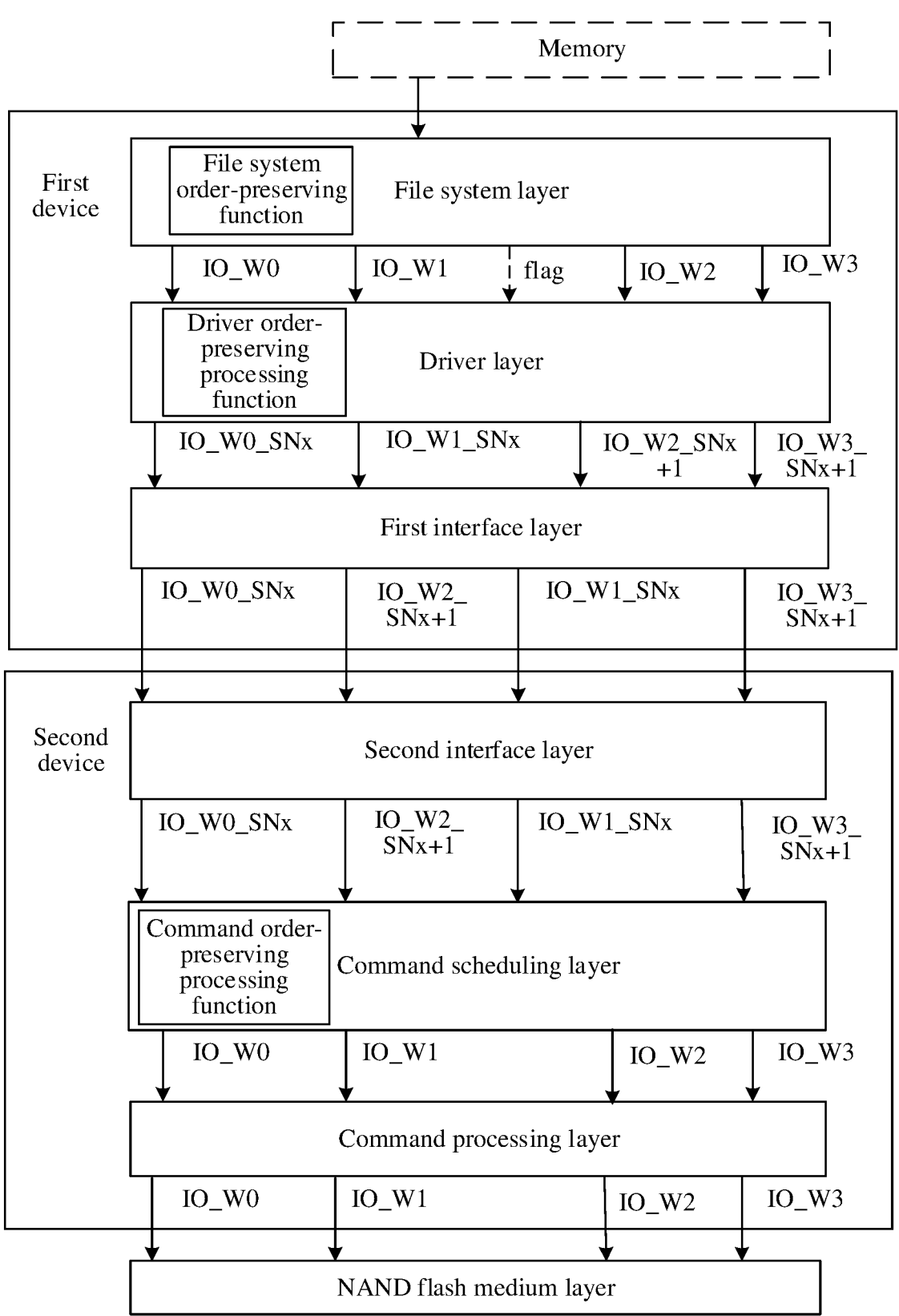
FIG. 3 is a diagram of a structure of another NAND flash memory system applicable to an embodiment of this application.

As shown in FIG. 3, a schematic diagram of a storage system based on an NAND flash memory is provided. Based on FIG. 1, a function 1 (optional), a function 2, and a function 3 are added to the storage system. Similarities with FIG. 1 are not repeatedly described.

Function 1 (optional): A file system order-preserving function is added for the host file system layer.

If there is the order-preserving requirement between the plurality first commands (for example, the IO write command) obtained by the host file system layer, the order-preserving identifier command (flag) may be delivered to the host driver layer by using the function 1. In some scenarios, an existing command delivered by the host file system layer to the host driver layer can enable the host driver layer to identify that the command needs order preserving. In this case, the function 1 is not needed. For example, the first command delivered by the host file system layer to the host driver layer includes the command for the node data and the command for the user data. The host driver layer may distinguish that there is the order-preserving requirement between the two types of first commands, and therefore the host file system layer does not need to deliver the order-preserving identifier command to the host driver layer.

For example, the host file system layer obtains the four first commands: IO_W0, IO_W1, IO_W2, and IO_W3 respectively, and IO_W1 and IO_W2 have the order-preserving requirement. For example, the command IO_W2 can be executed only after the command IO_W1 is executed. A sequence of the other commands is not limited. The file system order-preserving function may deliver the order-preserving identifier command flag between the IO_W1 command and the IO_W2 command that need order preserving, to notify the host driver layer that the order preserving between the IO_W1 command and the IO_W2 command is needed. For example, a sequence of sending the four first commands and the order-preserving identifier command flag by the file system order-preserving function to the host driver layer may be: IO_W0, IO_W1, the flag, IO_W2, and IO_W3.

Function 2: A driver order-preserving processing function is added for the host driver layer.

The driver order-preserving processing function maintains the sequence identifier of the command, for example, maintains a value of the serial number of the command. The sequence identifiers (for example, initial values of the serial numbers) maintained by the host driver layer and the device command scheduling layer are fixed, or the host driver layer and the device command scheduling layer negotiates the sequence identifier with each other. The driver order-preserving processing function allocates the sequence identifier (for example, the value of the serial number) to the plurality of first commands (for example, the IO write command).

In an example, the driver order-preserving processing function receives the plurality of first commands delivered by the host file system layer, and allocates a corresponding serial number to the plurality of first commands based on a preset serial number value rule. For example, a serial number allocated to the command IO_W0 received first is SNx, a serial number allocated to the command IO_W1 received second is SNx, and a serial number allocated to the command IO_W2 received thirdly is SNx. If the driver order-preserving processing function receives, after receiving the command IO_W1, the order-preserving identifier command (flag) delivered by the host file system layer, and receives the command IO_W2 after the order-preserving identifier command (flag), a value of a serial number of the next command (to be specific, the command IO_W2) of the order-preserving identifier command may be changed according to a specific rule, to indicate that the execution sequence of the next command (to be specific, the command IO_W2) of the order-preserving identifier command should be after that of the command before the order-preserving identifier command (flag). For example, if it is specified that a command with a smaller serial number is executed first, and a command with a larger serial number is executed later, a value of the serial number may be increased by 1, and the serial number allocated to the command IO_W2 is SNx+1. For another example, if it is specified that a command with a larger serial number is executed first, and a command with a smaller serial number is executed later, a value of the serial number may be subtracted by 1, and the serial number allocated to the command IO_W2 is SNx−1.

For the subsequent command IO_W3 received fourthly, the serial number may not be added, or the serial number may be added. If the serial number is added, a value of the serial number is not limited. For example, the serial number to be added is SNx+1, SNx, SNx−1, or SNx+2.

A serial number change rule of the driver order-preserving processing function of the host driver layer and a serial number change rule of the device command scheduling layer are fixed or known through negotiation. For example, the host driver layer and the device command scheduling layer fixedly start from 1 for an initial value of the serial number, and increase the value by 1 in sequence.

The host driver layer performs encapsulation on a command structure of IO_W0 and IO_W1. When a command with a smaller serial number is executed first, and a command with a larger serial number is executed later, a serial number SN added for a command field is x. Because the order-preserving identifier command (flag) is received, the serial number SN maintained by the host driver layer is increased by 1, the SN added for a command field of IO_W2 subsequently received is x+1, and the SN added for a command field of received IO_W3 is random. For example, the added serial number is SNx+1, to obtain IO_W3_SNx+1. The driver order-preserving processing function sends four second commands (IO_W0_SNx, IO_W1_SNx, IO_W2_SNx+1, IO_W3_SNx+1) through the host device hardware interface layer and the device hardware interface layer to the device command scheduling layer.

It may be understood that a sending sequence of the four second commands may be random. Because the second command includes the serial number, the device command scheduling layer may schedule the first commands in sequence based on the serial number, to meet the order-preserving requirement of the first command.

Function 3: A command order-preserving processing function is added for the device command scheduling layer.

The command order-preserving processing function schedules, for the second command delivered by the host driver layer, the plurality of first commands in an order specified by the sequence identifier (for example, the serial number) in the second command.

For example, the device command scheduling layer receives four commands delivered by the host driver layer: IO_W0_SNx, IO_W1_SNx, IO_W2_SNx+1, and IO_W3_SNx+1. IO_W2_SNx+1 may be received before IO_W1_SNx. In this case, the command order-preserving processing function sorts IO_W1_SNx and IO_W2_SNx+1 in ascending order based on the serial number SN.

The command order-preserving processing function restores the four second commands IO_W0_SNx, IO_W1_SNx, IO_W2_SNx+1, and IO_W3_SNx+1 to the first commands IO_W0, IO_W1, IO_W2, and IO_W3 obtained by the host file system layer, and sends these first commands to the device command processing layer in sequence of the serial number. The device command processing layer performs specific processing on the first command, and finally writes data to the NAND flash medium layer.

It may be understood that the first command sent by the host command scheduling layer to the host command processing layer does not carry the serial number, and the first command sent by the host processing layer to the NAND flash medium layer does not carry the serial number neither.

In the storage system based on the NAND flash memory, the serial number that indicates the execution sequence of the command is carried, so that sequence processing is performed between the commands according to a predefined serial number rule in several steps in an IO path of the entire storage system. The command delivered by the host to the device carries the serial number that indicates the execution sequence of the command, to notify the sequence of processing the commands by the device. The device processes the command based on the serial number. This resolves a problem of executing the commands in serial caused when the host file system layer needs, when there is the order-preserving requirement between the plurality of commands, to wait for processing results of commands previously delivered to the host driver layer in sequence and then delivers a subsequent command.

The foregoing describes the method in embodiments of this application, and the following describes an apparatus in embodiments of this application. The method and the apparatus are based on a same technical concept. The method and the apparatus have similar principles for resolving problems. Therefore, for implementations of the apparatus and the method, refer to each other. Details are not repeated herein.

In embodiments of this application, the apparatus may be divided into functional modules based on the foregoing method examples. For example, each functional module may be obtained through division based on each function, or two or more functions may be integrated into one module. These modules may be implemented in a form of hardware, or may be implemented in a form of a software functional module. It should be noted that the module division in embodiments of this application is an example, and is merely logical function division. In specific implementation, there may be another division manner.

Figure 4:
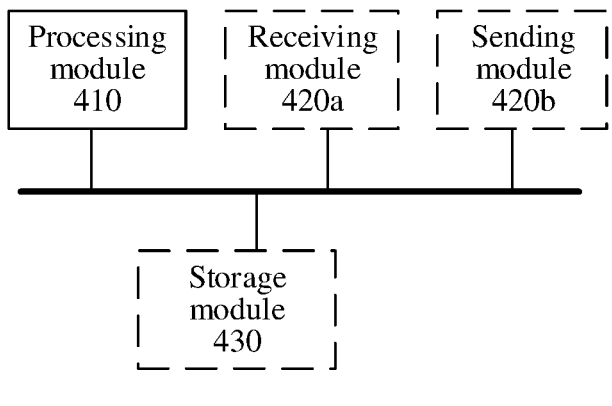
FIG. 4 is a diagram of a structure of a data processing apparatus applicable to an embodiment of this application.

Based on a same technical concept as the foregoing method, FIG. 4 provides a schematic diagram of a structure of a data processing apparatus 400. The apparatus 400 may include a processing module 410, and optionally, further includes a receiving module 420a, a sending module 420b, and a storage module 430. The processing module 410 may be separately connected to the storage module 430, the receiving module 420a, and the sending module 420b. The storage module 430 may also be connected to the receiving module 420a and the sending module 420b.

In an example, the receiving module 420a and the sending module 420b may alternatively be integrated and defined as a transceiver module.

In an example, the apparatus 400 may be a first device, or may be a chip or a functional unit applied to the first device. The apparatus 400 has any function of the first device in the foregoing method. For example, the apparatus 400 can perform steps performed by the first device in the methods in FIG. 2 and FIG. 3.

The receiving module 420a may perform a receiving action performed by the first device in the foregoing method embodiment.

The sending module 420b may perform a sending action performed by the first device in the foregoing method embodiment.

The processing module 410 may perform an action other than the sending action and the receiving action in the actions performed by the first device in the foregoing method embodiment.

In an example, the storage module 430 may store computer-executable instructions of the method performed by the first device, to enable the processing module 410, the receiving module 420a, and the sending module 420b to perform the method performed by the first device in the foregoing example.

For example, the storage module may include one or more memories. The memory may be one or more devices or components in a circuit that are used to store a program or data. The storage module may be a register, a cache, a RAM, or the like, and the storage module may be integrated with the processing module. The storage module may be a ROM or another type of static storage device that can store static information and instructions, and the storage module may be independent of the processing module.

The transceiver module may be an input or output interface, a pin, a circuit, or the like.

In an example, the apparatus 400 may be a second device, or may be a chip or a functional unit applied to the second device. The apparatus 400 has any functions of the second device in the foregoing method. For example, the apparatus 400 can perform steps performed by the second device in the methods in FIG. 2 and FIG. 3.

The receiving module 420a may perform a receiving action performed by the second device in the foregoing method embodiment.

The sending module 420b may perform a sending action performed by the second device in the foregoing method embodiment.

The processing module 410 may perform an action other than the sending action and the receiving action in the actions performed by the second device in the foregoing method embodiment.

In an example, the storage module 430 may store computer-executable instructions of the method performed by the second device, to enable the processing module 410, the receiving module 420*a*, and the sending module 420*b* to perform the method performed by the second device in the foregoing example.

For example, the storage module may include one or more memories. The memory may be one or more devices or components in a circuit that are used to store a program or data. The storage module may be a register, a cache, a RAM, or the like, and the storage module may be integrated with the processing module. The storage module may be a ROM or another type of the static storage device that can store static information and instructions, and the storage module may be independent of the processing module.

The transceiver module may be an input or output interface, a pin, a circuit, or the like.

The apparatus applied to the first device and the apparatus applied to the second device in embodiments of this application are described above. The following describes possible product forms of the apparatus applied to the first device and the apparatus applied to the second device. It should be understood that any product in any form that has the feature of the apparatus applied to the first device and any product in any form that has the feature of the apparatus applied to the second device in FIG. 4 fall within the protection scope of this application. It should be further understood that the following description is merely an example, and a product form of the apparatus applied to the first device and a product form of the apparatus applied to the second device in embodiments of this application are not limited thereto.

As a possible product form, the apparatus may be implemented by using a general bus architecture.

Figure 5:
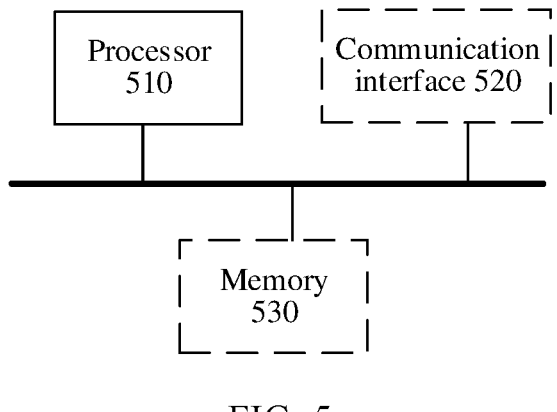
FIG. 5 is a diagram of a structure of a data processing apparatus applicable to an embodiment of this application.

FIG. 5 provides a schematic block diagram of a data processing apparatus 500.

The apparatus 500 may include a processor 510, and optionally, further includes a communication interface 520 and a memory 530. The communication interface 520 may be configured to receive a program or instructions and transmit the program or instructions to the processor 510. Alternatively, the communication interface 520 may be configured to perform communication interaction between the apparatus 500 and another communication device, for example, exchange control signaling and/or service data. The communication interface 520 may be a code and/or data read and write communication interface, or the communication interface 520 may be a signal transmission communication interface between the processor and the transceiver. The processor 510 and the memory 530 are electrically coupled.

In an example, the apparatus 500 may be a first device, or may be a chip applied to the first device. It should be understood that the apparatus has any function of the first device in the foregoing method. For example, the apparatus 500 can perform steps performed by the first device in the methods in FIG. 2 and FIG. 3. For example, the memory 530 is configured to store a computer program. The processor 510 may be configured to invoke the computer program or instructions stored in the memory 530, to perform the method performed by the first device in the foregoing example, or perform, through the communication interface 520, the method performed by the first device in the foregoing example.

In an example, the apparatus 500 may be a second device, or may be a chip applied to the second device. It should be understood that the apparatus has any function of the second device in the foregoing method. For example, the apparatus 500 can perform steps performed by the second device in the methods in FIG. 2 and FIG. 3. For example, the memory 530 is configured to store a computer program. The processor 510 may be configured to invoke the computer program or instructions stored in the memory 530, to perform the method performed by the second device in the foregoing example, or perform, through the communication interface 520, the method performed by the second device in the foregoing example.

The processing module 410 in FIG. 4 may be implemented by using the processor 510.

The receiving module 420*a* and the sending module 420*b* in FIG. 4 may be implemented by using the communication interface 520. Alternatively, the communication interface 520 is divided into a receiver and a transmitter. The receiver performs a function of the receiving module, and the transmitter performs a function of the sending module.

The storage module 430 in FIG. 4 may be implemented by using the memory 530.

In a possible product form, the apparatus may be implemented by using a storage controller (the storage controller may also be referred to as a chip or a chip system).

In a possible implementation, the storage controller includes a processor, and a communication interface coupled to the processor.

The processing module 410 in FIG. 4 may be implemented by using the processor.

The receiving module 420*a* and the sending module 420*b* in FIG. 4 may be implemented by using the communication interface. Alternatively, an input/output interface is divided into an input interface and an output interface. The input interface performs a function of the receiving module, and the output interface performs a function of the sending module.

The storage module 430 in FIG. 4 may be implemented by using a storage medium.

For example, the communication interface is configured to receive a plurality of second commands in parallel.

The processor is configured to: perform decapsulation on the second command, where the decapsulation includes parsing the first command and a sequence identifier that are included in the second command, and the sequence identifier indicates an execution sequence of a command having an order-preserving requirement; and schedule a plurality of first commands based on the sequence identifier.

In a possible implementation, the sequence identifier is a serial number. When the processor is configured to schedule the plurality of first commands based on the sequence identifier, the processor is specifically configured to:

schedule the plurality of first commands based on a numerical value of the serial number.

In a possible product form, the apparatus may be implemented by using a flash memory, and the flash memory includes the storage controller described above and a flash memory array.

The storage controller is configured to schedule the first command to access the flash memory array.

In a possible product form, the apparatus in embodiments of this application may be further implemented by using the following: one or more field programmable gate arrays (FPGAs), a programmable logic device (PLD), a controller, a state machine, a gate logic, a discrete hardware component, any other proper circuits, or any combination of circuits that can perform various functions described in this application.

An embodiment of this application further provides a computer-readable storage medium. The computer-readable storage medium stores a computer program. When the computer program is executed by a computer, the computer may be enabled to perform the foregoing data processing method. In other words, the computer program includes instructions used to implement the foregoing data processing method.

An embodiment of this application further provides a computer program product, including computer program code. When the computer program code is run on a computer, the computer is enabled to perform the data processing method provided above.

An embodiment of this application further provides a data processing system. The system includes a first device and a second device that perform the foregoing data processing method.

In addition, the processor mentioned in embodiments of this application may be a central processing unit (CPU), a baseband processor, a network processor (NP), or a combination of the CPU and the NP, where the baseband processor and the CPU may be integrated together or separated. The processor may further include a hardware chip or another general-purpose processor. The foregoing hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL) and another programmable logic device, a discrete gate or a transistor logic device, a discrete hardware component, or any combination thereof. The general-purpose processor may be a microprocessor, or the processor may be any conventional processor or the like.

The memory mentioned in embodiments of this application may be a volatile memory or a nonvolatile memory, or may include the volatile memory and the nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example and not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory described in this application is intended to include but is not limited to these memories and any other memory of a proper type.

The transceiver mentioned in embodiments of this application may include a separate transmitter and/or a separate receiver, or the transmitter and the receiver may be integrated. The transceiver may operate according to instructions of a corresponding processor. Optionally, the transmitter may correspond to a transmitter in a physical device, and the receiver may correspond to a receiver in the physical device.

Persons of ordinary skill in the art may be aware that, the method steps and units that are described with embodiments disclosed in this specification can be implemented by electronic hardware, computer software, or a combination thereof. To clearly describe the interchangeability between the hardware and the software, the foregoing has generally described steps and compositions of each embodiment based on functions. Whether the functions are performed by hardware or software depends on particular applications and design constraints of the technical solutions. Persons of ordinary skill in the art may use different methods to implement the described functions of each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a USB flash memory drive, a removable hard disk, a read-only memory (ROM), a random access memory (RAM), a magnetic disk, an optical disc, or the like.

The term "and/or" in this application describes an association relationship for describing associated objects, and indicates that three relationships may exist. For example, A and/or B may indicate the following three cases: Only A exists, both A and B exist, and only B exists. The character "/" generally indicates an "or" relationship between the associated objects. "A plurality of" mentioned in this application means two or more. In addition, it should be understood that, in the descriptions of this application, terms "first" and "second" are merely used for distinguishing and description, but should not be understood as indicating or implying relative importance, and should not be understood as indicating or implying a sequence.

Although some preferred embodiments of this application have been described, persons skilled in the art can make changes and modifications to these embodiments once they learn a basic inventive concept. Therefore, the following claims are intended to be construed as to cover the preferred embodiments and all changes and modifications falling within the scope of this application.

Apparently, persons skilled in the art can make various modifications and variations to embodiments of this application without departing from the spirit and scope of embodiments of this application. In this way, this application is intended to cover these modifications and variations of embodiments of this application provided that they fall within the scope of the claims of this application and their equivalent technologies.

What is claimed is:

1. A host data processing apparatus comprising:
a processor; and
a communication interface coupled to the processor,
wherein the processor is configured to:
    obtain a plurality of first I/O commands for accessing a NAND flash memory; and
    converting the plurality of first I/O commands into a plurality of second I/O commands by performing encapsulation on each of the first I/O commands to obtain a corresponding second I/O command, wherein the plurality of first I/O commands comprises a first target command and a second target command that have an order-preserving requirement, and a third target command that does not have an order-preserving requirement with respect to the first target command, wherein the encapsulation adds a sequence identifier to each of the first I/O command to form a corresponding second I/O command, and comprises adding a first sequence identifier to the first target command, adding a sequence identifier to the second target command, and adding a third sequence identifier to the third target command, wherein the first and second sequence identifiers indicate an execution sequence of the first and second target commands, and the first and third sequence identifiers indicate that there is not an execution sequence of the first and third target commands,
    sending, using the communication interface, the plurality of second I/O commands in parallel to a device data processing apparatus connected to the NAND flash memory for execution on the NAND flash memory according to sequence identifiers of the second I/O commands.

2. The host data processing apparatus according to claim 1, wherein the first target command is a write command for user data or a write command for node data, wherein the node data indicates a location at which the user data is stored.

3. The host data processing apparatus according to claim 1, wherein the processor is further configured to:
    obtain an order-preserving identifier command indicating that an execution sequence of a command before the order-preserving identifier command is earlier than an execution sequence of a next command of the order-preserving identifier command; and
    determine, as the first target command, a first I/O command obtained before the order-preserving identifier command and a first I/O command obtained after the order-preserving identifier command as the second target command.

4. The host data processing apparatus according to claim 3, wherein the first sequency identifier added to the first target command is different from the second sequency identifier added to the first target command, and the third sequence identifier added to the third target command is same as the first sequence identifier added to the first target command.

5. The host data processing apparatus according to claim 1, wherein the communication interface is configured to send the plurality of second I/O commands in parallel and out of order.

6. A device storage controller for performing I/O operations on a NAND flash memory, comprising:
a processor; and
a communication interface coupled to the processor,
wherein the communication interface is configured to:
    receive a plurality of second I/O commands in parallel from a host first data processing apparatus; and
wherein the processor is configured to:
    perform decapsulation on the plurality of second I/O commands to obtain a plurality of first I/O commands, wherein the decapsulation comprises parsing each second I/O command into a corresponding first I/O command and a sequence identifier associated with said corresponding first I/O command, wherein the plurality of first I/O commands comprises a first target command and a second target command that have an order-preserving requirement, and a third target command that does not have an order-preserving requirement with respect to the first target command, wherein the first target command has a first sequence identifier, the second target command has a second sequence identifier, and the third target command has a third sequence identifier, the first and second sequence identifiers indicate an execution sequence of the first and second target commands, and the first and third sequence identifiers indicate that there is not an execution sequence of the first and third target commands; and
    schedule the plurality of first I/O commands for execution on the NAND flash memory based on the sequence identifiers of first I/O commands.

7. A method of data processing performed by a host data processing apparatus, comprising:
    obtaining a plurality of first I/O commands for accessing a NAND flash memory;
    converting the plurality of first I/O commands into a plurality of second I/O commands by performing encapsulation on each of the first I/O commands to obtain a corresponding second I/O command, wherein the plurality of first I/O commands comprises a first target command and a second target command that have an order-preserving requirement, and a third target command that does not have an order-preserving requirement with respect to the first target command, wherein the encapsulation adds a sequence identifier to each of the first I/O command to form a corresponding second I/O command, and comprises adding a first sequence identifier to the first target command, adding a second sequence identifier to the second target commands, and adding a third sequence identifier to the third target command, wherein the first and second sequence identifiers indicate an execution sequence of the first and second target commands, and the first and third sequence identifiers indicate that there is not an execution sequence of the first and third target commands, and
    sending the plurality of second I/O commands in parallel to a data processing apparatus connected to the NAND flash memory for execution on the NAND flash memory according to sequence identifiers of the second I/O commands.

8. The method according to claim 7, further comprising:
    obtaining an order-preserving identifier command, wherein the order-preserving identifier command indicates that an execution sequence of a command before the order-preserving identifier command is earlier than an execution sequence of a next command of the order-preserving identifier command; and determining, as the first target command, a first I/O command obtained before the order-preserving identifier command and a first I/O command obtained after the order-preserving identifier command as the second target command.

9. A method of data processing performed by a device storage controller for performing I/O operations on a NAND flash memory, comprising:

receiving a plurality of second I/O commands in parallel from a host first data processing apparatus;

performing decapsulation on the plurality of second I/O commands to obtain a plurality of first I/O commands, wherein the decapsulation comprises parsing each second I/O command into a corresponding first I/O command and a sequence identifier associated with said corresponding first I/O command, wherein the plurality of first I/O commands comprises a first target command and a second target command that have an order-preserving requirement, and a third target command that does not have an order-preserving requirement with respect to the first target command, wherein the first target command has a first sequence identifier, the second target command has a second sequence identifier, and the third target command has a third sequence identifier, the first and second sequence identifiers indicate an execution sequence of the first and second target commands, and the first and third sequence identifiers indicate that there is not an execution sequence of the first and third target commands; and scheduling the plurality of first I/O commands for execution on the NAND flash memory based on the sequence identifiers of the first I/O commands.

* * * * *